(12) United States Patent
Chehanowitz et al.

(10) Patent No.: US 11,062,135 B1
(45) Date of Patent: Jul. 13, 2021

(54) SYSTEM, METHOD, AND COMPUTER PROGRAM FOR DETERMINING AND MARKING ON A DOCUMENT WHAT MAY BE OF INTEREST TO A USER

(71) Applicant: Amdocs Development Limited, Limassol (CY)

(72) Inventors: Sarit Chehanowitz, Tel Aviv (IL); Liat Taub Bahar, Kfar Saba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 103 days.

(21) Appl. No.: 16/414,056

(22) Filed: May 16, 2019

Related U.S. Application Data

(60) Provisional application No. 62/673,058, filed on May 17, 2018.

(51) Int. Cl.
| | |
|---|---|
| *G06F 40/117* | (2020.01) |
| *G06F 40/169* | (2020.01) |
| *G06F 40/171* | (2020.01) |
| *G06K 9/00* | (2006.01) |

(52) U.S. Cl.
CPC ........ *G06K 9/00469* (2013.01); *G06F 40/117* (2020.01); *G06F 40/169* (2020.01); *G06F 40/171* (2020.01)

(58) Field of Classification Search
None
See application file for complete search history.

(56) References Cited

U.S. PATENT DOCUMENTS

| | | | |
|---|---|---|---|
| 7,263,671 B2* | 8/2007 | Hull | G06F 40/169 |
| | | | 715/839 |
| 10,810,241 B2* | 10/2020 | Hughes | G06Q 30/0277 |
| 2010/0174985 A1* | 7/2010 | Levy | G06F 40/40 |
| | | | 715/244 |
| 2017/0357717 A1* | 12/2017 | Hughes | G06F 3/0488 |
| 2018/0096203 A1* | 4/2018 | King | G06F 40/166 |
| 2018/0260378 A1* | 9/2018 | Theodore | G06F 40/197 |
| 2020/0162561 A1* | 5/2020 | Milvaney | G06F 40/166 |

* cited by examiner

*Primary Examiner* — Soo Shin
(74) *Attorney, Agent, or Firm* — Zilka-Kotab, P.C.

(57) ABSTRACT

A system, method, and computer program product are provided for determining and marking on a document what may be of interest to a user. In operation, a system identifies at least one document of potential interest to at least one user. The system identifies interest points associated with the at least one document for the at least one user based on one or more of: previously identified interest points in the at least one document, previously identified interest points in other similar documents, and characteristics of the at least one document. Further, the system marks in the at least one document the identified interest points associated with the at least one document for easy viewing by the at least one user.

17 Claims, 7 Drawing Sheets

2. Purchase Price. The purchase price is $ _____ 40000 _____ [shmuel ur: How do you pay 40000 in cash] which shall be paid in cash at the closing. The earnest money described below shall be a credit against the purchase price, and will not be returned if the deal is not concluded.

3. Closing Agent. The closing agent shall be _____ George Orwell _____ . The closing agent shall disburse the earnest money [shmuel ur: What is this Earnest?] at the closing and perform any other duties agreed in writing among Buyer, Seller, and the closing agent. The closing agent shall not be liable, except for gross negligence or intentional misconduct, for any matter related to the performance of duties in connection with this Agreement.

4. Earnest Money. Buyer has paid to the closing agent a deposit of $ _____ toward the purchase price. If this earnest money has been paid by a check that is not honored by the bank upon which it is drawn, Buyer shall have 48 hours after written notice from the closing agent to deliver good funds to the closing agent. If Buyer does not do so, Seller shall have the right to terminate this Agreement upon written notice to Buyer. Upon letter from the buyer that he changes his opinion, within 48 hours the closer should return the Earnest money. [shmuel ur: Contradiction with 2?]

FIGURE 2B

2. Purchase Price. The purchase price is $ _____, which shall be paid in cash at the closing. The earnest money described below shall be a credit against the purchase price.

[Callout: Maybe add, returned if deal not conclude press here]

3. Closing Agent. The closing agent shall be _____. The closing agent shall disburse the earnest money at the closing and perform any other duties agreed in writing among Buyer, Seller, and the closing agent. The closing agent shall not be liable, except for gross negligence or intentional misconduct, for any matter related to the performance of duties in connection with this Agreement.

4. Earnest Money. Buyer has paid to the closing agent a deposit of $ _____ toward the purchase price. If this earnest money has been paid by a check that is not honored by the bank upon which it is drawn, Buyer shall have 48 hours after written notice from the closing agent to deliver good funds to the closing agent. If Buyer does not do so, Seller shall have the right to terminate this Agreement upon written notice to Buyer.

[Callout: If delivered what to stop the Seller from changing terms and collecting it?]

FIGURE 2C

SYSTEM, METHOD, AND COMPUTER PROGRAM FOR DETERMINING AND MARKING ON A DOCUMENT WHAT MAY BE OF INTEREST TO A USER

RELATED APPLICATIONS

The present application claims priority to U.S. Provisional Application No. 62/673,058, entitled "SYSTEM, METHOD, AND COMPUTER PROGRAM FOR DETERMINING AND MARKING ON A DOCUMENT WHAT MAY BE OF INTEREST TO A USER," filed on May 17, 2018, the entire contents of which is incorporated herein by reference.

FIELD OF THE INVENTION

The present invention relates to document-specific items of interest to a user.

BACKGROUND

People read many long papers, contracts, and many other documents, etc. These readers may be interested in the document but often just scan the documents and look for the things that are of interest to that particular reader. There are many summarization and marking technologies, usually based on either writing the content in a more succinct way, or for finding how the content of a document is different from other similar documents (e.g. for contracts, etc.), or for finding the commonality of many articles (e.g. a news summary, etc.).

There is thus a need for addressing these and/or other issues associated with the prior art.

SUMMARY

A system, method, and computer program product are provided for determining and marking on a document what may be of interest to a user. In operation, a system identifies at least one document of potential interest to at least one user. The system identifies interest points associated with the at least one document for the at least one user based on one or more of: previously identified interest points in the at least one document, previously identified interest points in other similar documents, and characteristics of the at least one document. Further, the system marks in the at least one document the identified interest points associated with the at least one document for easy viewing by the at least one user. Alternatively, a summary of these points seen of interest is created. This is not a summary of the document, but a summary of what others found interesting.

BRIEF DESCRIPTION OF THE DRAWINGS

FIGS. 2A-2C show examples of interfaces for presenting annotations to users, in accordance with one embodiment.

DETAILED DESCRIPTION

Figure 1:
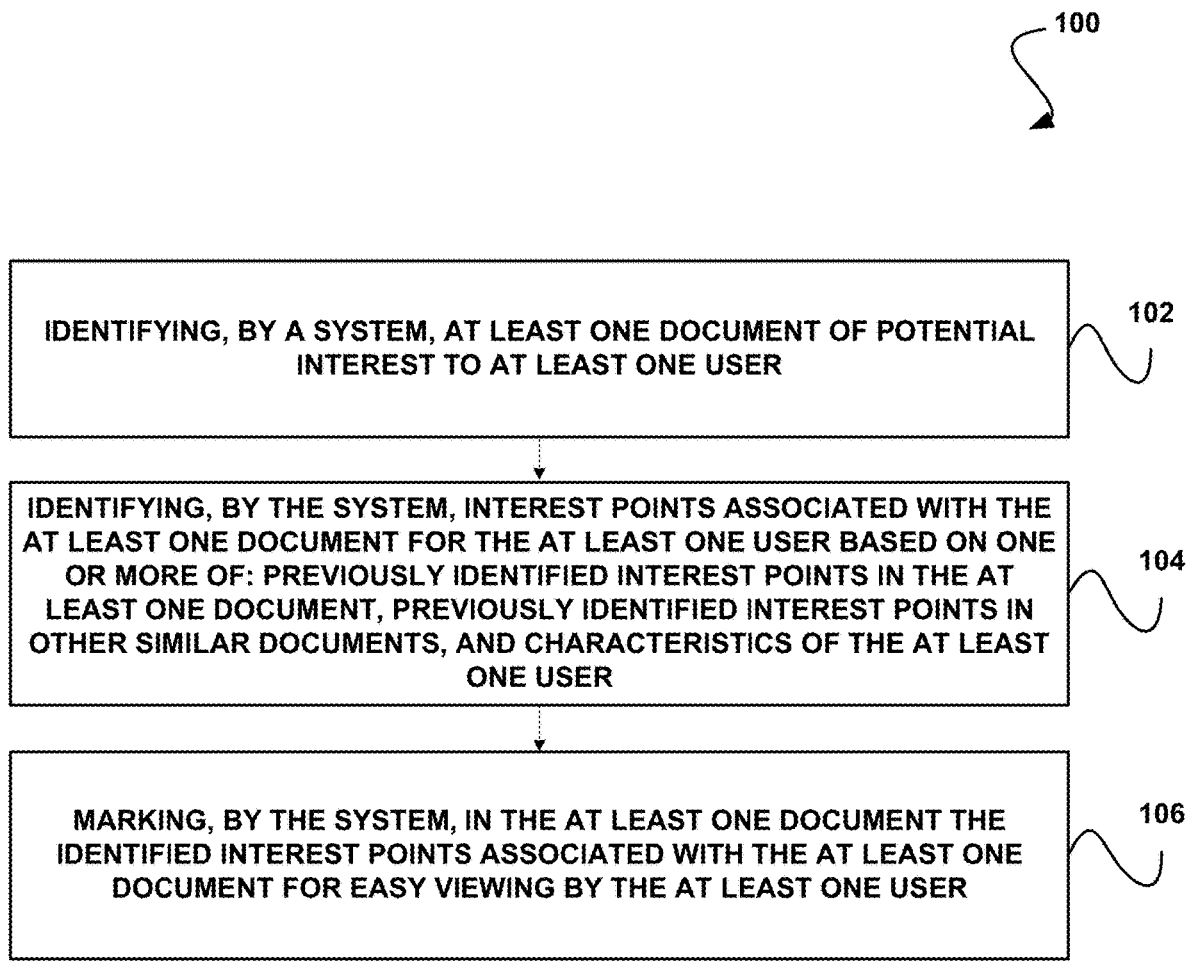
FIG. 1 illustrates a method for determining and marking on a document what may be of interest to a user, in accordance with one embodiment.

FIG. 1 illustrates a method 100 for determining and marking on a document what may be of interest to a user, in accordance with one embodiment.

In operation, a system identifies at least one document of potential interest to at least one user. See operation 102.

The system identifies interest points associated with the at least one document for the at least one user based on one or more of: previously identified interest points in the at least one document, previously identified interest points in other similar documents, and characteristics of the at least one document. See operation 104.

Further, the system marks in the at least one document the identified interest points associated with the at least one document for easy viewing by the at least one user. See operation 106.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
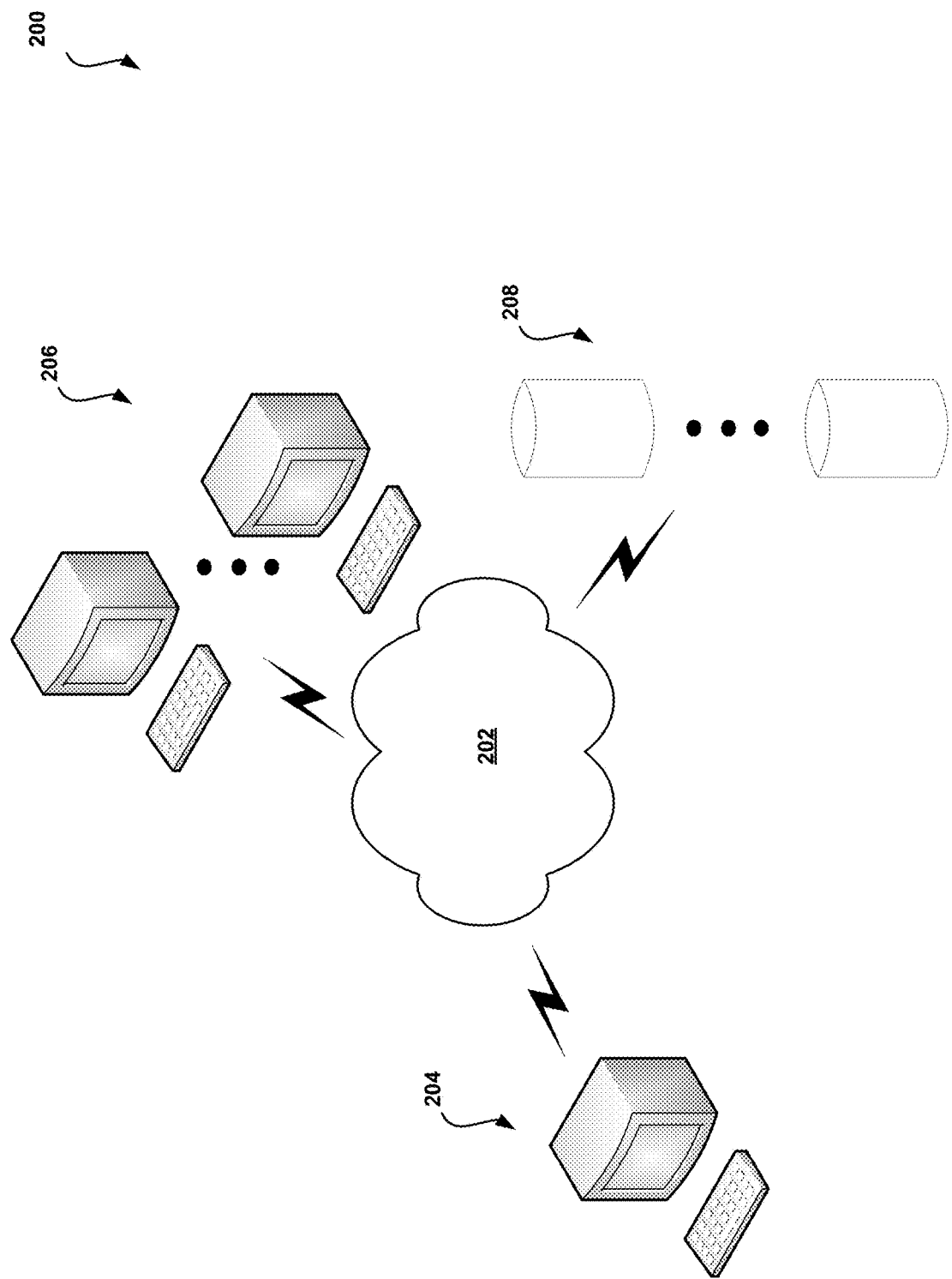
FIG. 2 shows a system for determining and marking on a document what may be of interest to a user, in accordance with one embodiment.

FIG. 2 shows a system 200 for determining and marking on a document what may be of interest to a user, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for determining and marking on a document what may be of interest to a user. The system 204 may also be in communication with one or more repositories/databases 208.

People read many long papers, contracts, and many other documents, etc. These readers may be interested in the document but often just scan the documents and look for the things that are of interest to that particular reader. There are many summarization and marking technologies, usually based on either writing the content in a more succinct way, or for finding how the content of a document is different than other similar documents (e.g. for contracts, etc.), or for finding the commonality of many articles (e.g. a news summary, etc.). The system 204 determines what may be of interest to a particular user.

Technologies in the past that summarized the document performed document understanding. The system 204 functions to understand how previous people interacted with documents similar to a document accessible to a particular reader. Items that other readers (e.g. other similar readers, etc.) found interesting may be of interest to that particular reader.

Further, the system 204 may cluster the people who interact with the document and determine/indicate how people in a particular cluster interacted with the document. The clustering implemented by the system 204 may be based on demographics but could also be based on why people are reading the documents (e.g. buyer versus seller of a house, etc.). In one embodiment, the system 204 may highlight for a person reading a document what people in the same cluster found interesting in similar documents, what actions they took, and/or what actions where successful, etc. Thus, the system 204 may operate to understand how people interact with documents.

A user interface may enable a user to select an action similar to actions taken by previous readers. This could be an action on the document (editing) but could be other actions. For example, people reading the document at some location may decide to check the current value of bitcoin. So this action checks (e.g. using Google, etc.) the value.

Different people are interested in different things in a document, for the purpose of this discussion, the different things may be referred to as "hats". The hat a person has on when the person reads the document, influences what is of interest to the person when reading. Below are some examples of hats, how they influence, and how the system 204 can know what hat a person has on.

One example is demographics, indicating who a person is. Examples of demographics include, for example: gender; owner of property (e.g. expensive apartment, house, office, etc.); age; religion; race; house location; etc.

A person may want to read a document themselves, or may find what others want to know is interesting.

Another example is role with respect to the document. This may include, for example: buyer/seller in a contract; technical/business in reading product literature; company documents such as HR documents, managerial documents, technical documents; user manuals for regular users or experts, etc.

The system 204 may determine a hat or a reader in a variety of ways. One way is to query a reader. The system 204 may also determine who a reader is and their role from the context in which the reader looks at the document. For example, if the document is in an email, and the person is given a contract for the apartment and is told where it is, from that the system 204 may determine that a reader is the renter (the owner knows where it is).

When the system 204 identifies what to highlight, the system 204 uses information collected on similar documents. The types of documents may include documents of specific kinds, such as apartment buying contracts, periodic journals, references, etc. The system 204 may use a clustering technique to identify documents similar to the document the user looks at, and what cluster it belongs to, as a base for finding out what to highlight.

One classification of the document may be the "hat" of the person who wrote it. For example, a document may be a contract written by a buyer or a seller, or by a scientist or sales person. This classification may help the system 204 understand what a reader should read in a document.

The system 204 may define things that are important in the document in the following way: things (type of things) that someone may comment on later (even more important if changed); things (type of things) that changed in the document in later versions; things that were carefully read; things that were discussed, etc.

In one embodiment, the system 204 may determine such information by eye tracking or mouse tracking, which are also used in web tracking. Further, the system 204 may determine what a user reacts to from email logs. Additionally, the system 204 may use track changes in the document to determine what was changed and who wrote what (labeled data). The system 204 may use data center calls to determine what people reacted to in the documents received. The system 204 may also use comments in forums to determine what part of the original document people react to.

The system 204 has various ways to collect data on interests of people. This can be used to annotate the documents. In some cases, the system 204 may know "hats" of users, for example buyers or sellers. Additionally, when a user asks for a change in a document, or reacts to a part of a contract, the system 204 can check, using the versions for example, if the change succeeded, or if the request did something. As a result, the system 204 can determine: what can be changed; what changes have more of a chance (e.g. a recommendation, how much the change could succeed, etc.); and the actions usually taken corresponding to a part of the documents. For example, if people perform a search when they arrive in an area, and the search ends in a specific URL, the system 204 may suggest this URL. For example, when reading a news article, people from Israel (e.g. a hat) may search for something and end up with a URL, the system 204 may determine the URL is interesting with respect to the word(s) they were searching.

Figure 2A:

The system 204 may present the information in various ways. For example, the system 204 may mark on the document, such as a heat map (e.g. as shown in FIG. 2A), what is of interest to the readers, for example due to eye tracking, tracking of mouse places, reading behavior, or tracked changes. The system 204 may also present a summary containing the important/common parts. The system 204 may also present actions that can be taken (e.g. taken by others) and the likelihood of success, attached to relevant part of the document. The system 204 may use a next arrow to get to a next interesting highlight portion (e.g. as shown in FIG. 2A).

Another source for annotation can be seen in FIG. 2B. In this example, the word Earnest and Cash are not really understood, and the definition of them is of interest. The system 204 shows a suggestion for changes for purchase price and earnest money. Some may be more important to buyers, some to sellers, depending on the statistics the system 204 collects.

In the annotated document shown in FIG. 2C, the same document is illustrated after collecting the statistics as shown to the user. In red, the system 204 shows places others consider. In black, the system 204 shows suggested actions. In green, the system 204 shows comments for a reader to consider.

By implementing these techniques, the system 204 allows for faster and more efficient reading of a document. Additionally, for a writing the document, authors will know where others will need clarifications, will want things, and also recognize areas for improving the document. These documents may be used in negotiations to determine what others did and how they did it. Further, the system 204 may turn the document, automatically, into a type of a form, where the common actions others performed are suggested with short-cuts.

Figure 3:
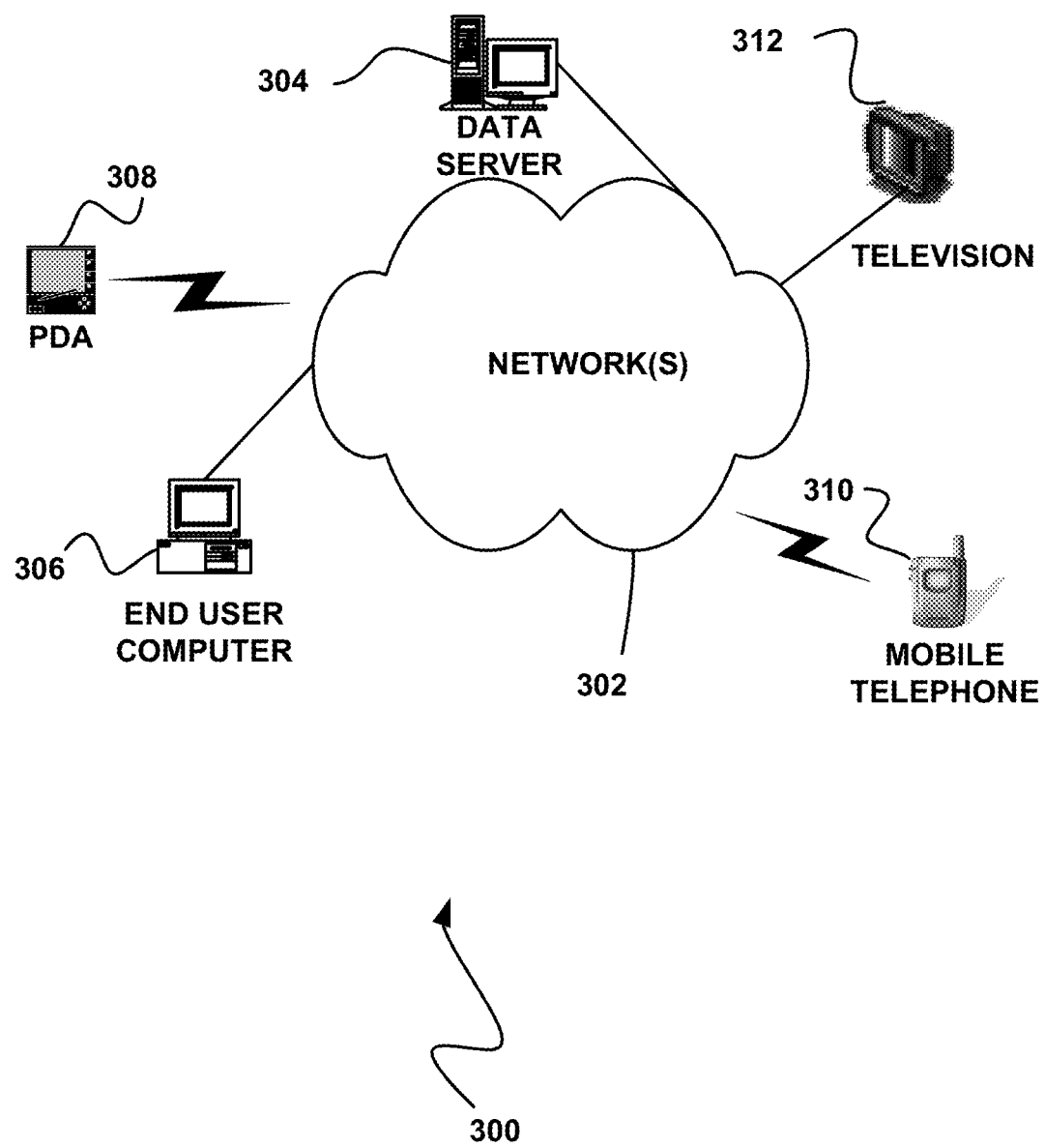
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
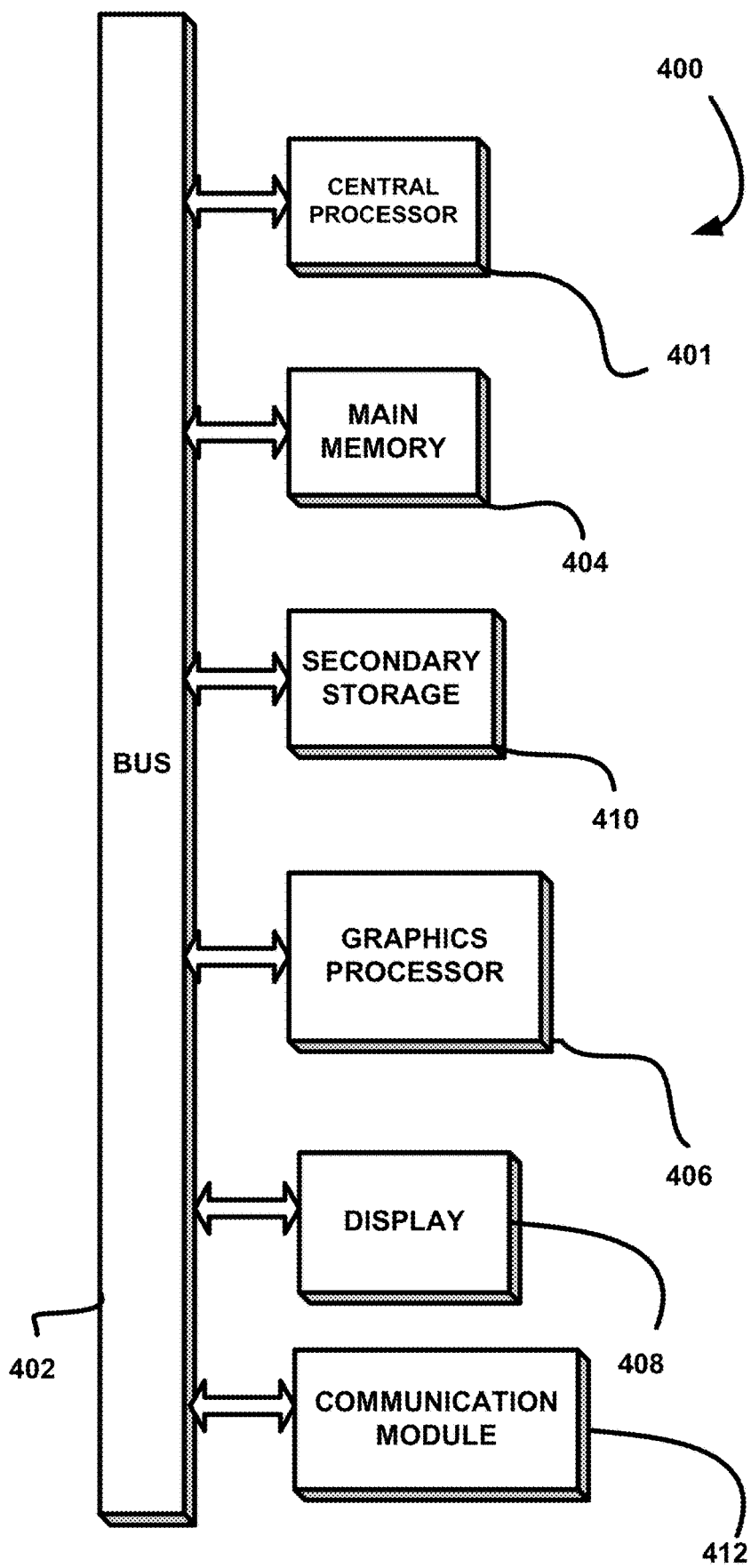
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a document of potential interest to a user;
   determining, by the system, items within the document that are of potential interest to the user, wherein the items are determined based on one or more of: previously identified items of interest within the document, previously identified items of interest within other documents, and characteristics of the document; and
   marking, by the system, the items within the document by adding visual indicators within the document in association with the items for viewing by the user;
   wherein at least one of the items within the document is marked with a visual indicator that indicates an action taken by another user, the action including performing a web search.

2. The method of claim 1, wherein the document is a contract.

3. The method of claim 1, wherein the document is an article.

4. The method of claim 1, wherein the determining, by the system, the items is based on the previously identified items of interest within the document.

5. The method of claim 4, wherein the previously identified items of interest within the document are determined from a cluster of people who interacted with document.

6. The method of claim 5, wherein the cluster of people are selected based on demographics.

7. The method of claim 1, wherein the determining, by the system, the items is based on the previously identified items of interest within other documents.

8. The method of claim 7, wherein the other documents include documents of a same kind as the document.

9. The method of claim 1, wherein the determining, by the system, the items is based on the characteristics of the document.

10. The method of claim 9, wherein the characteristics of the document include changed portions of the document.

11. The method of claim 1, wherein the marking, by the system, the items within the document includes presenting a heat map on the document.

12. The method of claim 1, wherein the user is an author of the document.

13. The method of claim 1, wherein the user is a reader of the document.

14. The method of claim 1, wherein at least a second one of the items within the document is marked with a second visual indicator that indicates a second action taken by the other user or a second other user, the action including editing the document.

15. The method of claim 1, wherein the marking the items includes annotating the items within the document.

16. A system, comprising:
    a non-transitory memory storing instructions; and
    one or more processors in communication with the non-transitory memory that execute the instructions to perform a method comprising:
    identifying a document of potential interest to a user;
    determining items within the document that are of potential interest to the user, wherein the items are determined based on one or more of: previously identified items of interest within the document, previously identified items of interest within other documents, and characteristics of the document; and
    marking the items within the document by adding visual indicators within the document in association with the items for viewing by the user;
    wherein at least one of the items within the document is marked with a visual indicator that indicates an action taken by another user, the action including performing a web search.

17. A non-transitory computer readable medium storing computer code executable by a processor to perform a method comprising:
    identifying a document of potential interest to a user;
    determining items within the document that are of potential interest to the user, wherein the items are determined based on one or more of: previously identified items of interest within the document, previously identified items of interest within other documents, and characteristics of the document; and
    marking the items within the document by adding visual indicators within the document in association with the items for viewing by the user;
    wherein at least one of the items within the document is marked with a visual indicator that indicates an action taken by another user, the action including performing a web search.

* * * * *